April 1, 1930.                    C. B. GARWOOD                    1,752,481
                         METHOD OF MAKING FLAT BOTTLES
                              Filed Nov. 20, 1928

Charles B. Garwood
Inventor

By C.A.Snow & Co.
Attorneys

Patented Apr. 1, 1930

1,752,481

UNITED STATES PATENT OFFICE

CHARLES B. GARWOOD, OF LINTHICUM HEIGHTS, MARYLAND, ASSIGNOR TO CARR-LOWREY GLASS CO., OF BALTIMORE, MARYLAND

METHOD OF MAKING FLAT BOTTLES

Application filed November 20, 1928. Serial No. 320,641.

This invention relates to a method of making bottles having flat sides.

As is well known to those skilled in the art the usual method of making bottles by hand includes the step of rolling the gather on a marble slab to give it a substantially cylindrical form and to reduce the neck portion. Thereafter the gather is placed in a mold and blown.

In the manufacture of bottles having flat faces the two steps referred to have been objectionable. This is due to the fact that, in a shop where bottles are being made, dust quckly gathers on the marble slabs and, when the gather is rolled thereon this dust is collected and becomes embedded in the surface of the gather. Consequently the finished bottle, with its smooth flat faces, will frequently be marred by the foreign substances embedded in said faces.

When the substantially cylindrical gather is placed in a mold in which is to be formed a bottle having flat faces, the transverse diameter of the bottle is greater than the smallest dimension of the cavity in the mold. Consequently, when the mold is closed about the gather, it will contact with the gather at opposed points before coming into contact with the remaining surface of the gather. Thereafter the gather is blown in the usual way but when the formed bottle is removed from the mold it will be found that where the gather was first touched and depressed by the closing mold defects known to the trade as "liver spots" have been produced on the opposed flat faces of the bottle. Heretofore, by all known methods, it has not been possible to produce flat bottles without forming these blemishes on a large percentage of them.

It is an object of the present invention to utilize certain steps in the method of producing flat bottles whereby the danger of picking up foreign particles during the initial shaping of the gather is reduced to the minimum and whereby the formation of blemishes such as "liver spots" on the finished bottles is eliminated entirely.

With the foregoing and other objects in view which will appear as the description proceeds, the invention resides in certain novel steps in the method of producing flat bottles, which will be hereinafter more fully described and pointed out in the claims, it being understood that various changes may be made in the method within the scope of the claims.

In the accompanying drawings.

Figure 1:
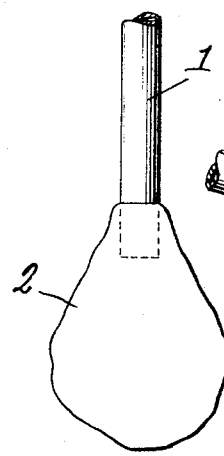
Figure 1 is a view of a portion of a blowpipe having a gather adhering thereto immediately following its withdrawal from the furnace.
Figure 2:
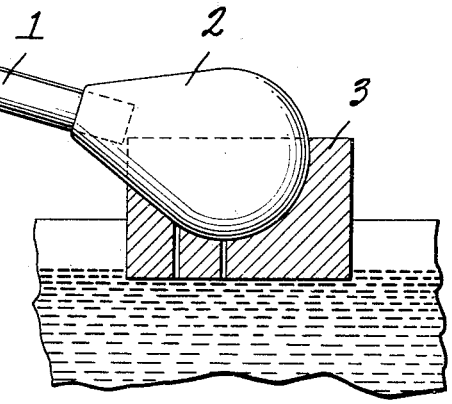
Figure 2 is a view more or less in diagram showing the second step of blocking the gather.
Figure 3:
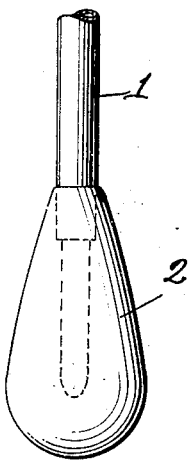
Figure 3 is a view similar to Figure 1 showing the third step wherein the initial puff is imparted to the gather after it has been blocked.

In carrying out the method the usual blowpipe 1 is used for collecting a gather 2 which is subsequently initially shaped in a block 3 of the usual construction. Thereafter an initial puff is given to the gather so as to elongate it as shown in Figure 3.

The marver used in the present instance consists of a plate 4 bent to provide a trough the sides of which diverge upwardly. This trough is mounted on a suitable support 5 and is so proportioned that when the gather 2 is placed therein and rotated, the said gather will be given a substantially cylindrical form. By placing the gather on the edge of the marver and rotating it the neck portion can be reduced prior to or following the shaping of the gather in the marver.

Figure 5:
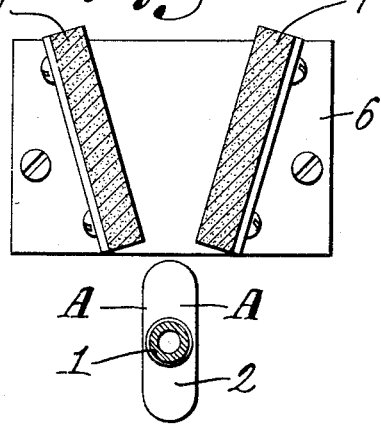
Figure 5 is a section through the flattening device used in carrying out the next step of the method, the flattened gather being shown after it has passed through said device.
Figure 6:
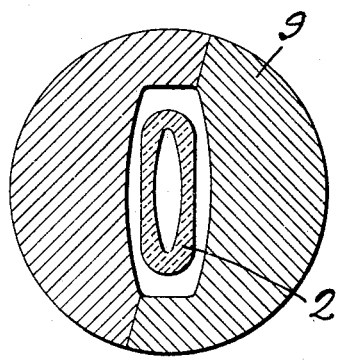
Figure 6 is a section through a mold showing the flattened gather positioned therein prior to being blown.

The next step in producing a flat faced bottle requires the use of a device one form of which has been illustrated in Figure 5. As shown in said figure the device can include a connecting member 6 having downwardly converging blocks 7 attached thereto, the distance between these blocks at their lower ends being equal to the thickness to which the gather is to be reduced. The blocks are formed preferably of carbon and have smooth faces. After the gather has been shaped in the marver it is swung downwardly between the blocks 7 and, when it passes therefrom, it will be formed with opposed flat faces as indicated at A in Figure 5.

Under some conditions, it might be desirable to use a different form of shaping device. For example, the structure shown in Figure 7 might be used. This consists of a small block 8 of carbon and the gather can be shaped by pressing it downwardly on this block to flatten one side and then reversing the gather and pressing it downwardly on the block to flatten the opposite side. Importance is attached to the fact that in both cases the block or blocks are formed of carbon. This is to prevent charring of the blocks by the hot metal so that dust in the form of ash will not be produced and there will be no danger of foreign substances being picked up by the surface of the hot gather as it is applied to the block or blocks.

Figure 7:
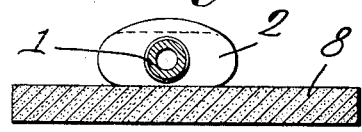
Figure 7 is a section through a modified form of flattening device which can be used in lieu of the device shown in Figure 5, a gather being shown in position thereon during the first flattening operation.

After the gather has been shaped as shown in Figure 5 and Figure 7 it is inserted into the mold 9 and it will be noted that when thus positioned the gather will not be pressed inwardly by the wall of the mold when said mold is closed. The metal of the gather contacts with the mold solely when the gather is finally blown and all of the metal will thus be displaced outwardly against the walls of the mold and a smooth surface will be produced free from all blemishes.

Figure 8:
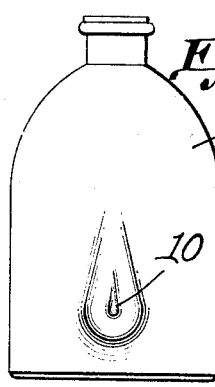
Figure 8 is a side elevation of a bottle having a liver spot thereon such as produced by methods heretofore employed.
Figure 9:
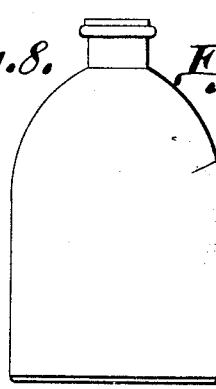
Figure 9 is a similar view of a bottle produced by the present method and without blemishes.

As heretofore explained, should one or more of the walls come against the gather before the final blowing operation, one or more liver spots such as shown at 10 in Figure 8 would be produced on the bottle B. By first flattening the gather by means of a device such as shown in Figure 5 or in Figure 7, this danger is eliminated and the finished bottle will be free from blemishes, as shown in Figure 9.

Figure 4:
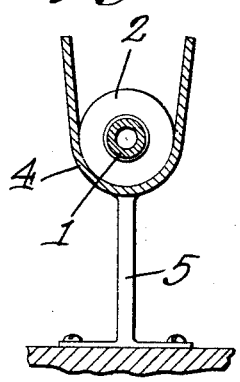
Figure 4 is a section through a novel form of marver used in the next step of the method, the position of the gather during the marvering operating being indicated.

Importance is attached to the use of the particular form of marver illustrated in Figure 4 because this insures shaping of the gather on a relatively small surface on which dust does not have time to accumulate between successive applications of gathers thereto. Heretofore, where a gather has been rolled back and forth along a relatively large slab, the same portion of the surface has not always been used during successive operations and, therefore, dust and other foreign particles have had opportunity to be deposited on the surface at points where the same might be picked up during one of the marvering operations. Instead of rolling the gather back and forth on a marver the gather, in the present instance, is rotated within a marver.

What is claimed is:

1. The herein described method of making glass bottles having flat faces which includes the step of flattening opposed faces of the gather prior to insertion of the gather in a mold.

2. In a method of producing glass bottles having flat faces, the step of flattening portions of a partially blown gather by applying said gather to a flat carbon surface, and subsequently inserting the gather in a mold, the flattened faces of the partially blown gather being spaced from the walls of the mold.

3. The herein described method of making glass bottles having flat faces, which includes the steps of rotating a partially blown gather within a trough-like marver, subsequently flattening opposed faces of the gather by applying them to a flat surface, and finally placing the partially blown flat gather in a mold with its flattened faces out of contact with the mold.

4. The herein described method of producing glass bottles having flat faces free from specks and liver spots which includes the steps of rotating a partially blown gather within a trough-shaped marver to impart a substantially cylindrical form to the gather, thereafter impressing opposed portions of the gather upon carbon surfaces to produce flat faces, and subsequently placing the flattened partially blown gather in a mold with the flat faces out of contact with the mold.

In testimony that I claim the foregoing as my own, I have hereto affixed my signature.

CHARLES B. GARWOOD.